United States Patent
Freda et al.

(10) Patent No.: US 12,262,276 B2
(45) Date of Patent: Mar. 25, 2025

(54) METHODS FOR SIDELINK TRANSMIT-RECEIVE DISTANCE DETERMINATION

(71) Applicant: INTERDIGITAL PATENT HOLDINGS, INC., Wilmington, DE (US)

(72) Inventors: Martino M. Freda, Laval (CA); Tao Deng, Roslyn, NY (US); Moon-il Lee, Melville, NY (US); Tuong Duc Hoang, Montreal (CA); Chunxuan Ye, San Diego, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 406 days.

(21) Appl. No.: 17/601,516

(22) PCT Filed: Apr. 3, 2020

(86) PCT No.: PCT/US2020/026664
§ 371 (c)(1),
(2) Date: Oct. 5, 2021

(87) PCT Pub. No.: WO2020/206319
PCT Pub. Date: Oct. 8, 2020

(65) Prior Publication Data
US 2022/0201423 A1    Jun. 23, 2022

Related U.S. Application Data

(60) Provisional application No. 62/830,133, filed on Apr. 5, 2019, provisional application No. 62/886,433, filed
(Continued)

(51) Int. Cl.
*H04W 4/021* (2018.01)
*H04W 4/029* (2018.01)
(Continued)

(52) U.S. Cl.
CPC ........... *H04W 4/021* (2013.01); *H04W 4/029* (2018.02); *H04W 4/40* (2018.02); *H04W 64/003* (2013.01); *H04W 72/02* (2013.01); *H04W 72/20* (2023.01)

(58) Field of Classification Search
None
See application file for complete search history.

(56) References Cited

U.S. PATENT DOCUMENTS

| 10,791,584 B2 | 9/2020 | Kim et al. |
| 2018/0254794 A1 | 9/2018 | Lee et al. |

(Continued)

FOREIGN PATENT DOCUMENTS

| WO | 2017053738 A1 | 3/2017 |
| WO | 2019036578 A1 | 2/2019 |

OTHER PUBLICATIONS

Fujitsu, "Further Study on Tx-Rx Distance based HARQ Feedback," 3GPP TSG RAN WG1 #96b, R1-1905378, Xian, China (Apr. 8-12, 2019).

(Continued)

*Primary Examiner* — Jason E Mattis
*Assistant Examiner* — Bao G Nguyen
(74) *Attorney, Agent, or Firm* — Volpe Koenig

(57) ABSTRACT

Systems, methods, and devices for sidelink transmit-receive distance related determinations are disclosed herein. In one example, a wireless transmit receive unit (WTRU) may be configured with an associate between range information and zone configuration. The WTRU receive an indication of a specific range information requirement and determine its own zone location based on the configured information and location means (e.g., GPS). The WTRU may also receive (Continued)

zone location information of a transmitting device, and determine the distance between the WTRU and the transmitting device.

15 Claims, 9 Drawing Sheets

Related U.S. Application Data on Aug. 14, 2019, provisional application No. 62/908,206, filed on Sep. 30, 2019, provisional application No. 62/930,976, filed on Nov. 5, 2019.

(51) Int. Cl.
| | |
|---|---|
| H04W 4/40 | (2018.01) |
| H04W 64/00 | (2009.01) |
| H04W 72/02 | (2009.01) |
| H04W 72/20 | (2023.01) |

(56) References Cited

U.S. PATENT DOCUMENTS

| | | | |
|---|---|---|---|
| 2019/0174503 A1 | 6/2019 | Adachi et al. | |
| 2020/0162864 A1 | 5/2020 | Lee et al. | |
| 2020/0304159 A1* | 9/2020 | Liao | H04J 11/0036 |
| 2020/0314832 A1* | 10/2020 | Baghel | H04W 72/51 |

OTHER PUBLICATIONS

Huawei et al., "Sidelink physical layer procedures for NR V2X," 3GPP TSG RAN WG1 #96b, R1-1903944, Xian, China (Apr. 8-12, 2019).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.Nov. 2016 (Dec. 7, 2016).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital, Inc., "Physical Layer Procedures for NR V2X Sidelink," 3GPP TSG RAN WG1 #99, R1-1912742, Reno, USA (Nov. 18-22, 2019).
Qualcomm Incorporated, "Physical layer procedures for sidelink," 3GPP TSG RAN WG1 #96b, R1-1905012, Xian, China (Apr. 8-12, 2019).
Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331 V1.0.0 (Nov. 2007).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.5.0 (Mar. 2019).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.9.0 (Mar. 2020).
Third Generation Partnership Project, "Technical Specification Group Radio Access Network; NR; Multiplexing and channel coding (Release 15)," 3GPP TS 38.212 V15.5.0 (Mar. 2019).
Third Generation Partnership Project, "Technical Specification Group Radio Access Network; NR; Multiplexing and channel coding (Release 15)," 3GPP TS 38.212 V15.8.0 (Dec. 2019).
Third Generation Partnership Project, "Technical Specification Group Radio Access Network; NR; Multiplexing and channel coding (Release 16)," 3GPP TS 38.212 V16.0.0 (Dec. 2019).
Third Generation Partnership Project, "Technical Specification Group Radio Access Network; NR; Medium Access Control (MAC) protocol specification (Release 15)," 3GPP TS 38.321 V15.4.0 (Dec. 2018).
Third Generation Partnership Project, "Technical Specification Group Radio Access Network; NR; Medium Access Control (MAC) protocol specification (Release 15)," 3GPP TS 38.321 V15.8.0 (Dec. 2019).
Third Generation Partnership Project, "Technical Specification Group Radio Access Network; NR; Radio Resource Control (RRC) protocol specification (Release 15)," 3GPP TS 38.331 V15.5.0 (Mar. 2019).
Third Generation Partnership Project, "Technical Specification Group Radio Access Network; NR; Radio Resource Control (RRC) protocol specification (Release 15)," 3GPP TS 38.331 V15.9.0 (Mar. 2020).
Third Generation Partnership Project, "Technical Specification Group Radio Access Network; Study on Scenarios and Requirements for Next Generation Access Technologies; (Release 14)," 3GPP TR 38.913 V14.1.0 (Dec. 2016).
Third Generation Partnership Project, "Technical Specification Group Radio Access Network; Study on Scenarios and Requirements for Next Generation Access Technologies; (Release 15)," 3GPP TR 38.913 V15.0.0 (Jun. 2018).
Fraunhofer HHI et al., "Physical Layer Procedures for NR V2X," 3GPP TSG RAN WG1 #99, R1-1912290, Reno, USA (Nov. 18-22, 2019).
Third Generation Partnership Project, "Technical Specification Group Services and System Aspects; Architecture enhancements for 5G System (5GS) to support Vehicle-to-Everything (V2X) services (Release 16)," 3GPP TS 23.287 V0.2.0 (Mar. 2019).
Third Generation Partnership Project, "Technical Specification Group Services and System Aspects; Architecture enhancements for 5G System (5GS) to support Vehicle-to-Everything (V2X) services (Release 16)," 3GPP TS 23.287 V16.2.0 (Mar. 2020).

* cited by examiner

US 12,262,276 B2

METHODS FOR SIDELINK TRANSMIT-RECEIVE DISTANCE DETERMINATION

CROSS-REFERENCE TO RELATED APPLICATIONS

This application is the U.S. National Stage, under 35 U.S.C. § 371, of International Application No. PCT/US2020/026664 filed Apr. 3, 2020, which claims the benefit of U.S. Provisional Application Nos. 62/830,133, filed Apr. 5, 2019, 62/886,433 filed Aug. 14, 2019, 62/908,206 filed Sep. 30, 2019, and 62/930,976 filed Nov. 5, 2019 the contents of which are incorporated herein by reference.

SUMMARY

Systems, methods, and devices for sidelink transmit-receive distance related determinations and operations are disclosed herein. In one example, a wireless transmit receive unit (WTRU) may be configured with an associate between range information and zone configuration. The WTRU receive an indication of a specific range information requirement and determine its own zone location based on the configured information and location means (e.g., GPS). The WTRU may also receive zone location information of a transmitting device, and determine the distance between the WTRU and the transmitting device.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

The following are possible abbreviations and acronyms that may be discussed herein: Acknowledgement (ACK); Block Error Rate (BLER); Contention-Based (CB) (e.g., access, channel, resource); Channel Busy Ratio (CBR); Cyclic Prefix (CP); Orthogonal Frequency-Division Multiplexing (OFDM); Conventional OFDM (CP-OFDM) (e.g., relying on cyclic prefix); Channel Quality Indicator (CQI); Channel Occupancy Ratio (CR); Cyclic Redundancy Check (CRC); Channel State Information (CSI); Device to Device transmissions (D2D) (e.g., LTE Sidelink); Downlink Control Information (DCI); Digital Fourier Transform spread OFDM (DFT-s-OFDM); Downlink (DL); Demodulation Reference Signal (DMRS); Feed Back (FB); Frequency Division Duplexing (FDD); Frequency Division Multiplexing (FDM); Listen-Before-Talk (LBT); Low Latency Communications (LLC); Long Term Evolution (LTE) (e.g., from 3GPP LTE R8 and up); Medium Access Control (MAC); Negative ACK (NACK); Massive Broadband Communications (MBB); MultiCarrier (MC); Modulation and Coding Scheme (MCS); Out-Of-Band (OOB) (e.g., emissions); Total available WTRU power in a given TI (Pcmax); Packet Delay Budget (PDB); Physical Layer (PHY); Physical SL Control Channel (PSCCH); Physical SL Feedback Channel (PSFCH); Primary Synchronization Signal (PSS); Physical SL Shared Channel (PSSCH); PSSCH Reference Signal Received Power (PSSCH-RSRP); Quality of Service (QoS) (e.g., from the physical layer perspective); Radio Network Identifier (RNTI); Radio Resource Control (RRC); Radio Resource Management (RRM); Receiver (RX); Reference Signal (RS); Round-Trip Time (RTT); SL Received Signal Strength Indicator (S-RSSI); Side Link (SL); Synchronization Signal (SS); Secondary Synchronization Signal (SSS); Transport Block (TB); Time-Division Duplexing (TDD); Time-Division Multiplexing (TDM); Transmission Time Interval (TTI); Transmission/Reception Point (TRP); Transmitter (TX); Transceiver (TRX); Uplink (UL); Ultra-Reliable and Low Latency Communications (URLLC); Vehicular to Everything communications (V2X).

Figure 1A:
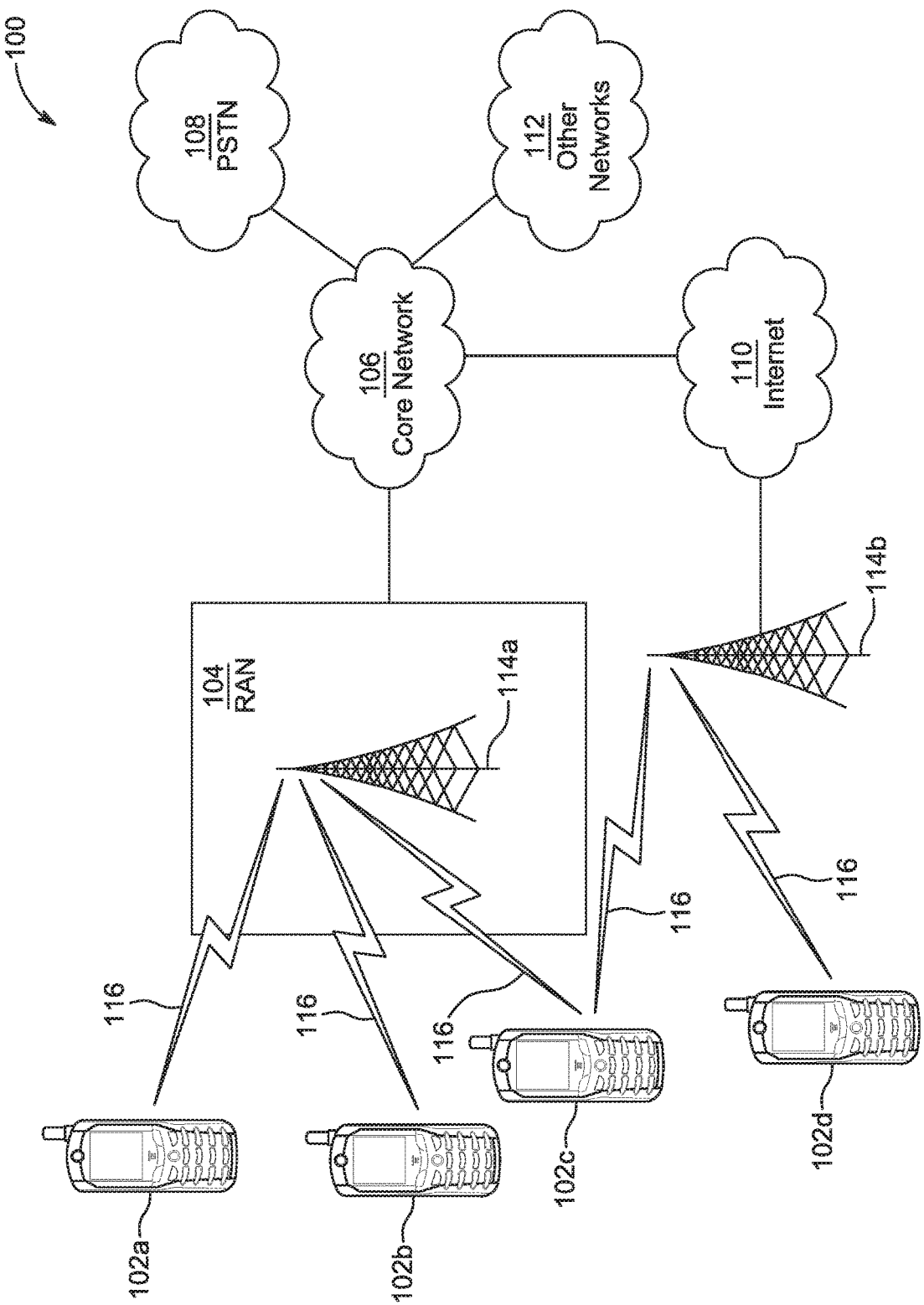
FIG. 1A is a system diagram illustrating an example communications system in which one or more disclosed embodiments may be implemented.

FIG. 1A is a system diagram illustrating an example communications system 100 according to an example architecture. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that any use case contemplates any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like.

In some cases, a WTRU may also be a vehicle, or a road side unit (RSU). In one example, the WTRU may be physically integrated into the vehicle, where components of the WTRU are physically separate. In one example, the WTRU is operatively connected to the vehicle. In one example, the WTRU may be removably attached to the vehicle. In one example, the WTRU may be permanently attached to the vehicle. In one example, the WTRU may be representative of the vehicle and its physical properties (e.g., size, speed, location, etc.). Any of the WTRUs 102a, 102b, 102c and 102d may be interchangeably referred to as a, terminal, device, UE, or vehicle.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access , which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
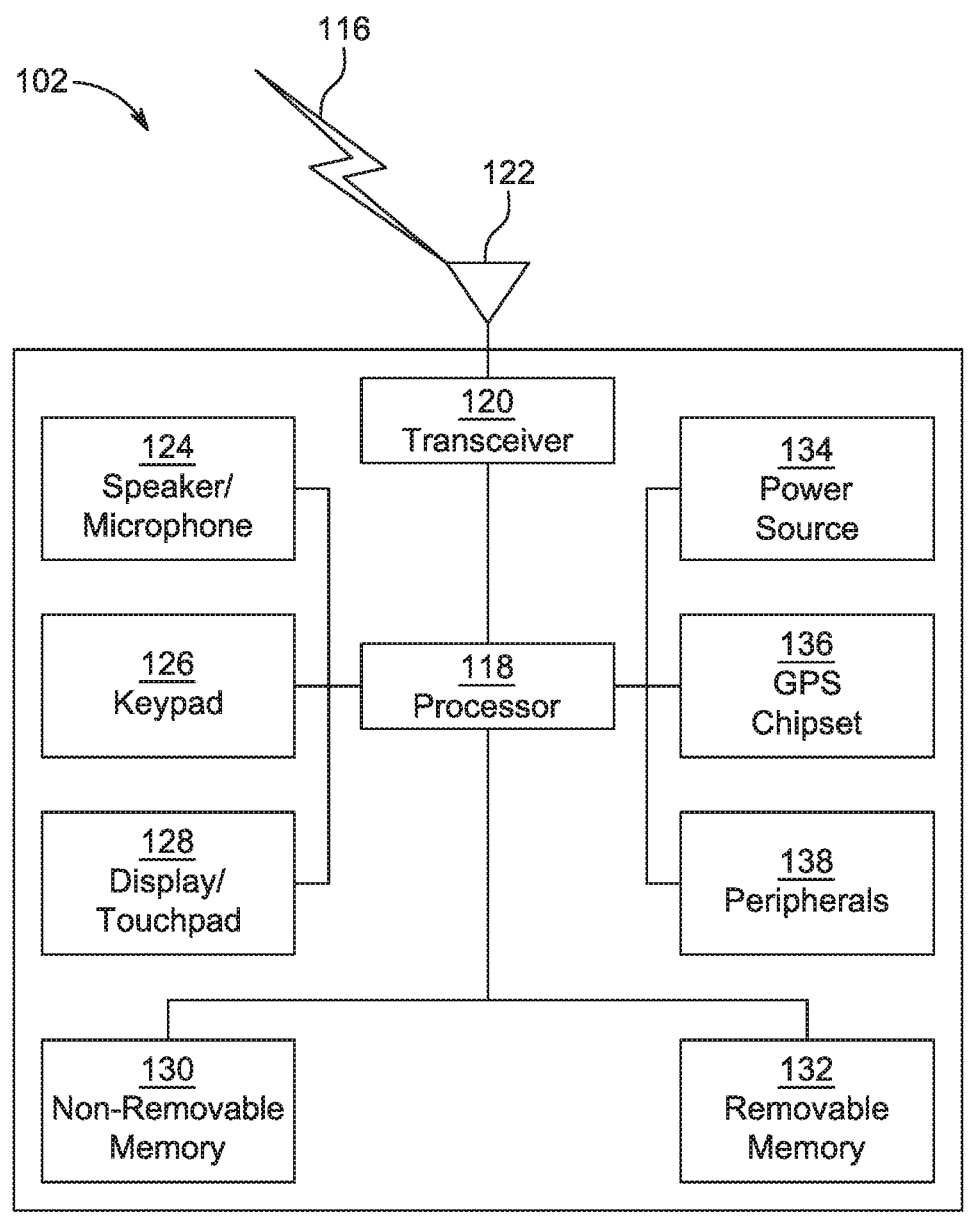
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a plurality of components/elements, such as a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
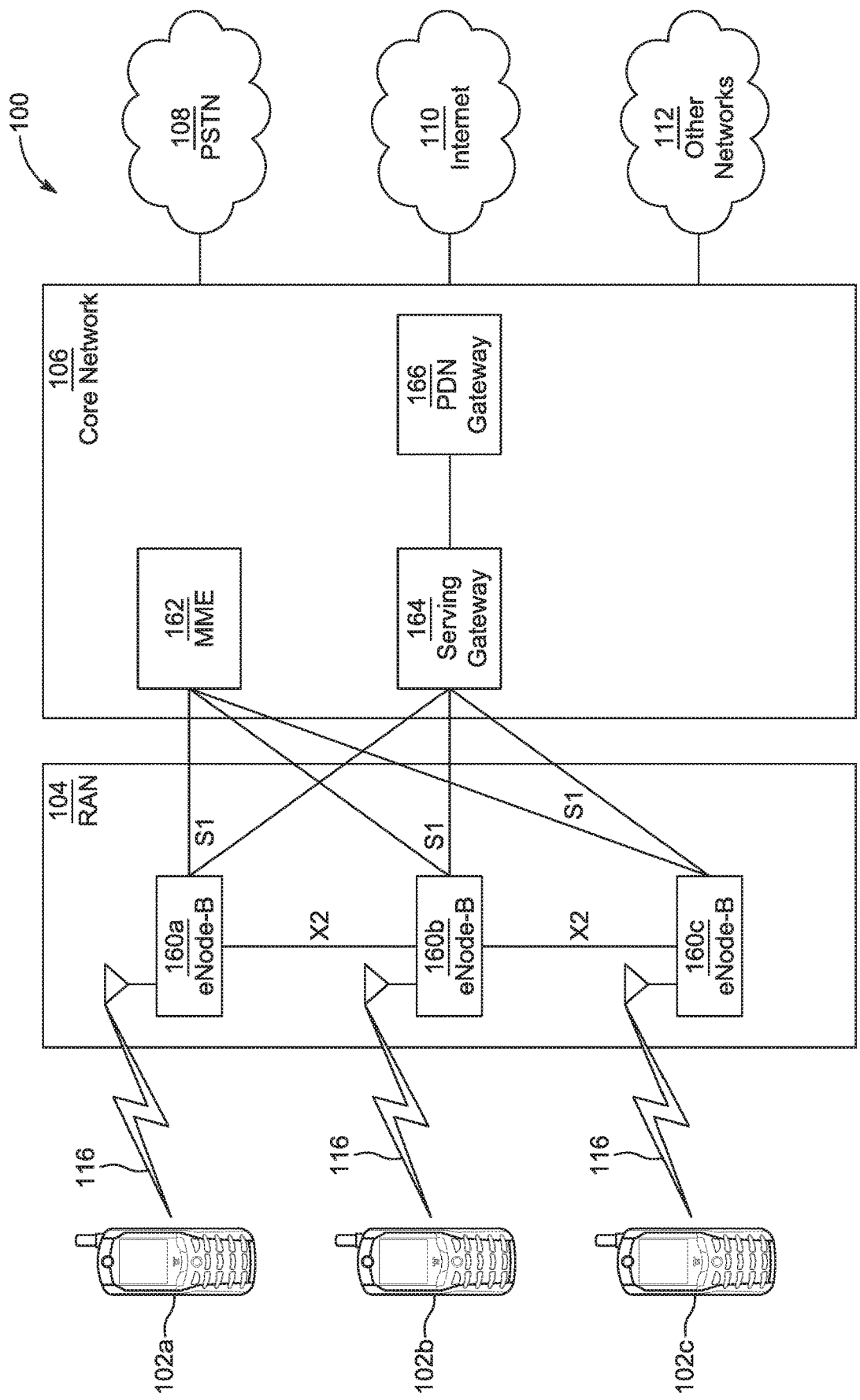
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an example architecture. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in examples herein as a wireless terminal, it is contemplated that in certain scenarios that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
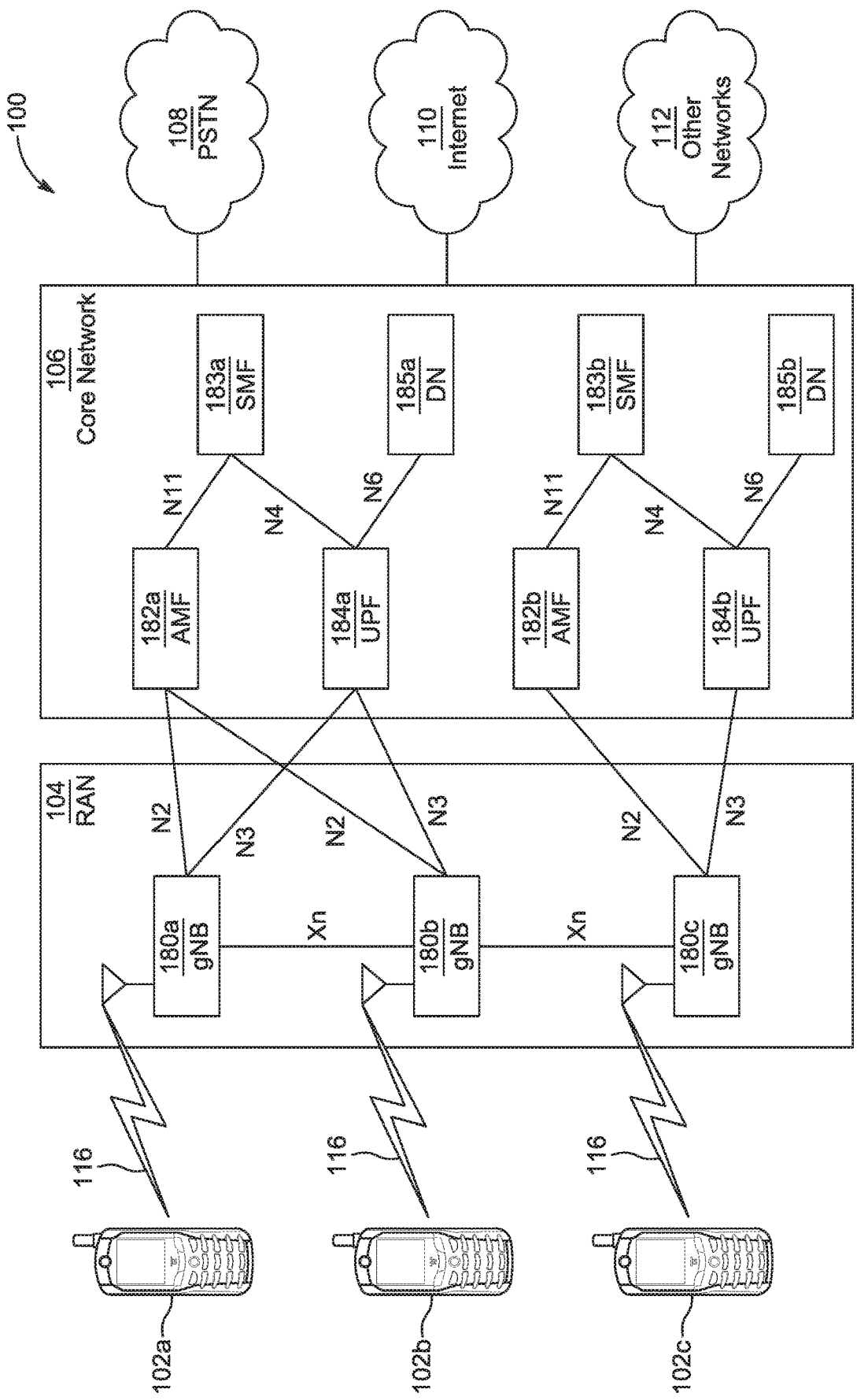
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an example architecture. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In some cases, one or more emulation devices (not shown) may carryout the functions described herein, such as: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein. The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 1E:
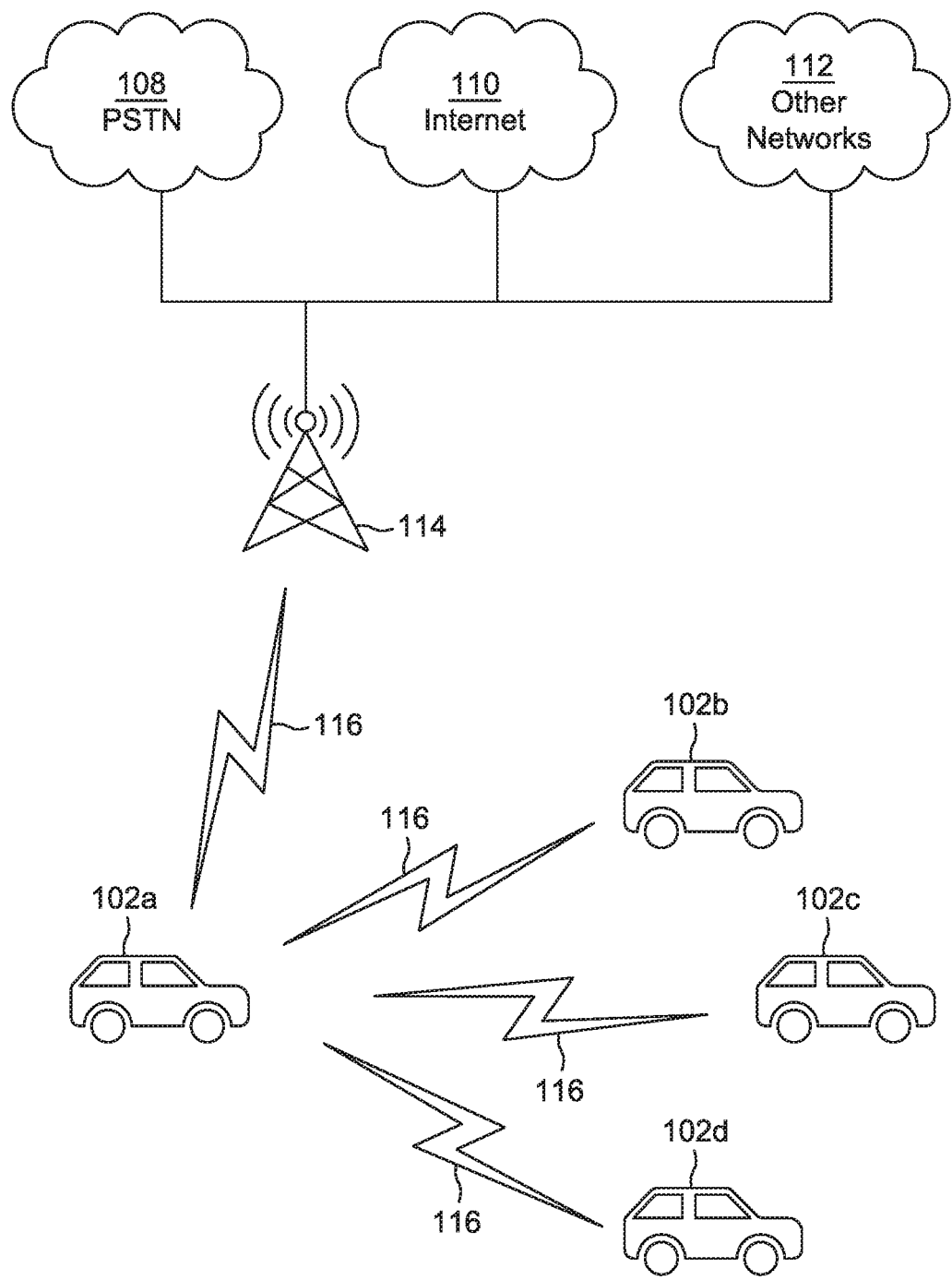
FIG. 1E is a system diagram illustrating an example architecture related to Vehicle to Everything (V2X) communication.

FIG. 1E is a system diagram illustrating an example architecture related to Vehicle to Everything (V2X) communication. In a V2X scenario, WTRU 102a may communicate over a wireless interface 116 with one or more WTRUs 102b, 102c, 102d via sidelink (SL) communication. There may be several types of SL communication, such as unicast, broadcast, and groupcast. SL communication may be considered to be a form of Device to Device (D2D) communication. Additionally and/or alternatively, WTRU 102a may communicate via a wireless interface to a base station 114, as discussed herein.

In a V2X communication situation, a WTRU may select a transmission resource pool for communicating with another WTRU or base station. The transmission resource pool may correspond to an identity of a geographical zone in which the WTRU is located. The WTRU may determine a Area_ID based on its geographic coordinates and Area (pre)configuration. The WTRU may obtain the coordinates (X, Y) in meters according to the WGS84 model, where X may be the geodesic distance in longitude between the WTRU's current location and geographical coordinates (0, 0), and Y may be the geodesic distance in latitude between the WTRU's current location and geographical coordinates (0, 0). As discussed herein, WGS84 is a known model, and generally may include mapping techniques such as coordinate systems relative to the earth, and support for location determining systems, such as satellite navigation (e.g., GPS, etc.).

The WTRU may receive the Area (pre)configuration in a message (e.g., SystemInformationBlockType21 or SL-V2X-Preconfiguration), which may include one or more of the following parameters: L, which is the zoneLength in meters; W, which is the zoneWidth in meters; $N_X$, which is the zoneIDLongiMod; and/or $N_Y$, which is the zoneIDLatiMod.

Accordingly, the WTRU may compute/determine a zone_ID based on the coordinates and parameters above as follows: $X_1$=Floor (X/L) Mod $N_X$; $Y_1$=Floor (Y/W) Mod $N_Y$; Zone_ID=$Y_1 * N_X + X_1$.

The WTRU may select a transmission resource pool with a (pre)configured Zone_ID equal to the computed Zone_ID. In one example, the zoneLength and zoneWidth values may be [5, 10, 20, 50, 100, 200, 500] meters and the zoneIDLongiMod and zoneIDLatiMod values can be [1, 2, 3, 4]. The WTRU may determine which resource to use based on the resources available in the pool, or may be preconfigured to use a specific resource or range of resources given certain parameters. Once the resources are determined, a WTRU may use the resources for transmission and/or receiving information from another WTRU(s) or base station.

In some cases, during a wireless communication, such as the examples of FIG. 1E, one or more factors may cause an error in receiving a transmission. For example, there may be environmental interference that may degrade the signal quality and/or reception ability that may ultimately cause errors in the transmission. In order to counteract these errors, Hybrid Automatic Repeat Request (HARQ) processing may be utilized. HARQ may be used in a variety of wireless communications scenarios, such as those described herein, where if a transmission is received with errors, feedback may be sent back to the transmitting device (e.g., WTRU, base station, etc.). For example, the feedback may indicate that certain components of the transmission were not received and/or need to be resent.

For some transmission types, the use of HARQ may be based on information related to the distance and or signal to noise information. For example, SL groupcast transmission may use HARQ to address any potential transmission issues between two or more WTRUs. Similarly, for SL broadcast transmission HARQ may be used for potential transmission issues between two or more WTRUs, and for SL unicast transmission HARQ may be used for potential transmission issues between two WTRUs. In some cases, a WTRU may determine to employ HARQ feedback based on a transmit-receive (TX-RX) distance and/or RSRP. For example, when an V2X WTRU (e.g., in NR) receives a packet, it may have the knowledge of the distance between itself and the V2X WTRU who sends the packet. This feature may be helpful in evaluating whether certain NR V2X quality of service (QoS) requirement(s) (e.g., range for a groupcast transmission) is satisfied. Considering the high WTRU mobility that may be supported in V2X advanced use cases, the TX-RX distance may vary at a fast rate so it is important that a V2X WTRU update the TX-RX distance in a timely fashion and with some degree of accuracy. Accordingly, there is a need for a WTRU to be able to determine its location relative to another WTRU (e.g., a TX-RX distance) and to do so in an efficient manner.

In some instances, the TX-RX distance may not be derivable using the PHY measurements, such as SL-RSRP. SL-RSRP is based on a linear average over the power of resource elements occupied by a Physical SL Feedback Channel (PSSCH) DMRS within the Physical Resource Blocks (PRBs) assigned in the associated Physical SL Control Channel (PSCCH). SL-RSRP may be used to estimate a path loss or a "radio distance", but it may not necessarily be translatable to a geographical distance because the SL-RSRP measurement(s) take into account the radio signal propagation including blockage, shadowing, and multi-path conditions. Accordingly, there is need for one or more techniques to obtain a geographical TX-RX distance.

Further, in some instances the dynamic determination of the TX-RX distance may cause signaling overhead. Since the TX-RX distance may be used to determine whether a HARQ feedback transmission shall be used for a received PSSCH transmission, a WTRU may evaluate a TX-RX distance on some basis (e.g., a per-transport block (TB) basis considering the high-speed of V2X WTRUs, or LTE, or NR, etc.). Therefore, the dynamic determination of TX-RX distance, along with associated information, may need to be transmitted using radio layer signaling, such as Sidelink Control Information (SCI). Accordingly, there is a need for one or more techniques that reduce the incurred signaling overhead.

As discussed herein, when describing a HARQ transmission in a Physical SL Feedback Channel (PSFCH) and its associated data transmission in a PSSCH, the WTRU transmitting the PSSCH and associated PSCCH may be referred to as a TX WTRU. The WTRU receiving the PSCCH and PSSCH, and thus transmitting an associated PSFCH, may be referred to as a RX WTRU. Additionally, as discussed herein zone, local zone, sub-zone, and PHY zone may be used interchangeably.

Generally, a WTRU may determine and/or be (pre)configured with an association (e.g., a mapping and/or a table) between a zone size and QoS range requirement and/or TX-RX distance accuracy. For example, the higher the TX-RX distance accuracy that may be required, then the smaller the zone size that may be selected.

Figure 2:
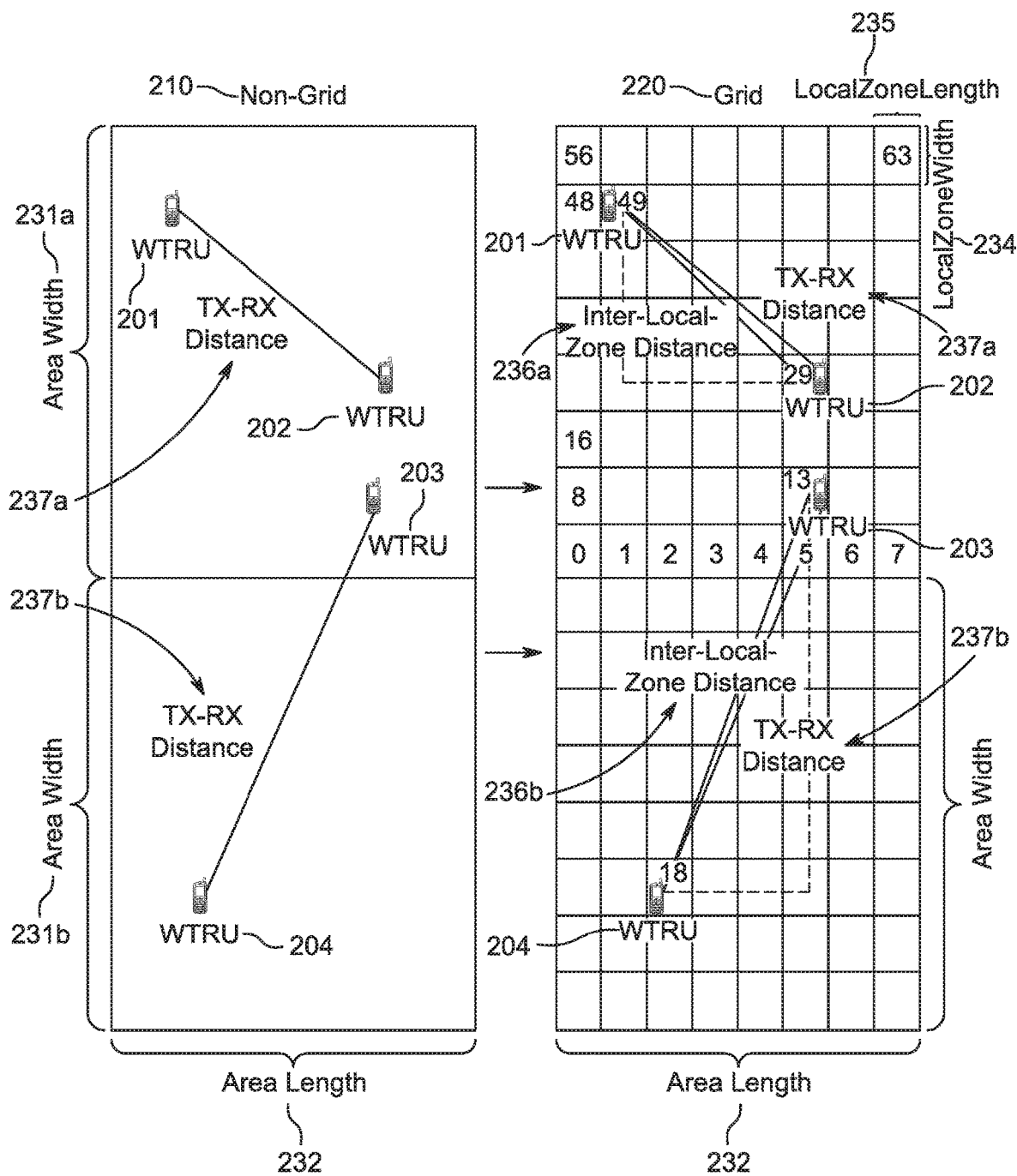
FIG. 2 illustrates an example of determining a TX-RX distance based on local zones.

In one approach to determining TX-RX distance, a WTRU may divide a geographic Area (e.g., a SL Area) in which the WTRU resides into zones (e.g., local zones). FIG. 2 illustrates an example of determining a TX-RX distance based on local zones. A WTRU may determine to partition a (pre)configured Area 210 into a grid of local zones 220 based on one or more factors, such as zone length and width, QoS range requirement, and/or TX-RX distance accuracy. Each local zone may have a length and width, such as localzonelength 235 and localzonewidth 234. Each Area may have its own set of local zones.

As shown, there may be one or more WTRUs, such as WTRU 201, WTRU 202, WTRU 203, and WTRU 204. In this example, WTRU 201 is communicating with WTRU 202, and WTRU 203 is communicating with WTRU 204.

Accordingly, a WTRU may determine a local zone denominator (N) and partition one Area in to N by N local zones; note that in the example shown, the division may have an equal number of local zones in both the longitude and latitude, however, in other examples not shown the division may not be equal for longitude and latitude. The length and width of a local zone may thus be Area_Length/N and Area_Width/N meters, respectively. For purposes of this example, an Area may be a square and have the same number of local zones in latitude as it does in longitude.

A WTRU may assign each local zone with a Local_Zone_ID based on one or more (pre)configured rules. In one approach, a WTRU may be (pre)configured to assign an integer as the Local_Zone_ID starting from zero following the ascending longitude first and latitude next. For the example in FIG. 2, the arrow 241 shows that the Local_Zone ID starts at 0 and increases by one for each local zone, moving right, then moving upward once the edge of an Area is reached. In this example, a WTRU may partition an Area to 64 local zones (i.e., N=8), and assign each local zone a Local_Zone_ID as illustrated; accordingly, by starting with a Local_Zone ID of 0 in the bottom left, the last Local_Zone ID is 63 in the top right.

In another approach, a WTRU may be (pre)configured to assign an integer for the Local_Zone_ID including an Area_ID. For example, a WTRU may assign a Local_Zone_ID equal to Local_Zone_ID+Area_ID*N2. This may differ in that the signaling may increase to carry the Local_Zone_ID information.

A WTRU may determine a TX-RX distance based on the local zones, as shown in FIG. 2. Generally, a WTRU may include an TX WTRU Local_Zone_ID in a PSCCH transmission. For example, a WTRU may transmit the Local_Zone_ID in a SCI bit field in the PSCCH associated with the PSSCH transmission. In one example, a 6-bit Local_Zone_ID information may be transmitted in the PSCCH. In another example, a WTRU may transmit the Local_Zone_ID in PSSCH. A WTRU may determine a TX-RX distance based on one or more factors, such as: TX Local_Zone_ID; RX Local_Zone_ID; TX WTRU Area_ID information (e.g., Area_ID, $TX\_X_1$ and $TX\_Y_1$); and/or RX WTRU Area_ID.

In one example, a RX WTRU may implicitly determine the TX WTRU Area_ID based on the received PSSCH resource allocation. In another example, a RX WTRU may determine the TX WTRU Area_ID based on a received explicit indication in PSCCH and/or PSSCH.

A RX WTRU may determine a TX-RX distance based on the inter-Local-Zone distance, such as 236a and 236b. Initially, the RX WTRU may determine whether the RX WTRU and the TX WTRU are located in the same Area based on the received TX WTRU Area_ID information.

When the TX WTRU and RX WTRU are not in the same Area, the RX WTRU may then determine the delta values: $Delta\_X_1$, which is the difference between $TX\_X_1$ and $RX\_X_1$; and $Delta\_Y_1$, which is the difference between $TX\_Y_1$ and $RX\_Y_1$.

In some cases, a RX WTRU may compute $RX\_X_1$ and $RX\_Y_1$ as discussed herein, and derive $TX\_X_1$ and $TX\_Y_1$ based on $TX\_X_1$=TX WTRU Area_ID Mod $N_X$, $TX\_Y_1$=Floor(TX WTRU Area_ID/$N_X$). Alternatively, the $TX\_X_1$ and $TX\_Y_1$ may be indicated in PSCCH associated with the PSSCH transmission. For example, a WTRU may indicate each value in a 2-bit field in the SCI.

The RX WTRU may then determine an Inter-Local-Zone distance based on one or more factors, such as the TX Local_Zone_ID and RX Local_Zone_ID, and/or $Delta\_X_1$ and $Delta\_Y_1$, when the TX WTRU and RX WTRU are not in the same Area.

When the RX WTRU and the TX WTRU are located in the same Area (e.g., TX Area_ID is equal to the RX Area_ID), a WTRU may determine the TX-RX distance based on: TX-RX distance≈Inter-Local-Zone distance=SQRT(((ABS(Floor(TXLocal_Zone_ID,N)−Floor (RX Local_Zone_ID,N))*W)$^2$+(ABS(MOD (TXLocal_Zone_ID,N)−MOD(RXLocal_Zone_ ID,N))*L)$^2$).

Thus, for WTRU 201 and WTRU 202, the TX-RX distance may be SQRT((ABS(Floor(49,8)− Floor(29,8))*W)$^2$+(ABS(MOD(49,8)−MOD (RX29,8))*L)$^2$)=SQRT((3* W)$^2$+(4*L)$^2$).

When the RX WTRU and the TX WTRU are located in different Areas (i.e., TX Area_ID may not equal to RX Area_ID), a WTRU may determine the TX-RX distance based on: TX-RX distance≈Inter-Local-Zone distance=SQRT (((ABS($Delta\_X_1$*N+Floor (TXLocal_Zone_ID,N)−Floor(RXLocal_Zone_ ID,N)))*W)$^2$+ABS((($Delta\_Y_1$*N+(MOD (TXLocal_Zone_ID,N)−MOD(RX Local_Zone_ ID,N))))*L)$^2$).

Thus, for WTRU 203 to WTRU 204, the TX-RX distance may be=SQRT (((ABS(8+Floor(13,8)−Floor(18,8)))*W)$^2$+ ABS(((0+(MOD(13,8)−MOD(18,8)))*L)$^2$)= SQRT((7*W)$^2$+(3* L)$^2$).

Note that the TX-RX distance, as discussed herein, when using zones may be determined from the center of each zone. For example, WTRU 202 is slightly to the right of the local zone, however, the TX-RX distance measured to WTRU 201 is measured from the center of local zone 13 to the center of local zone 49.

Figure 3:
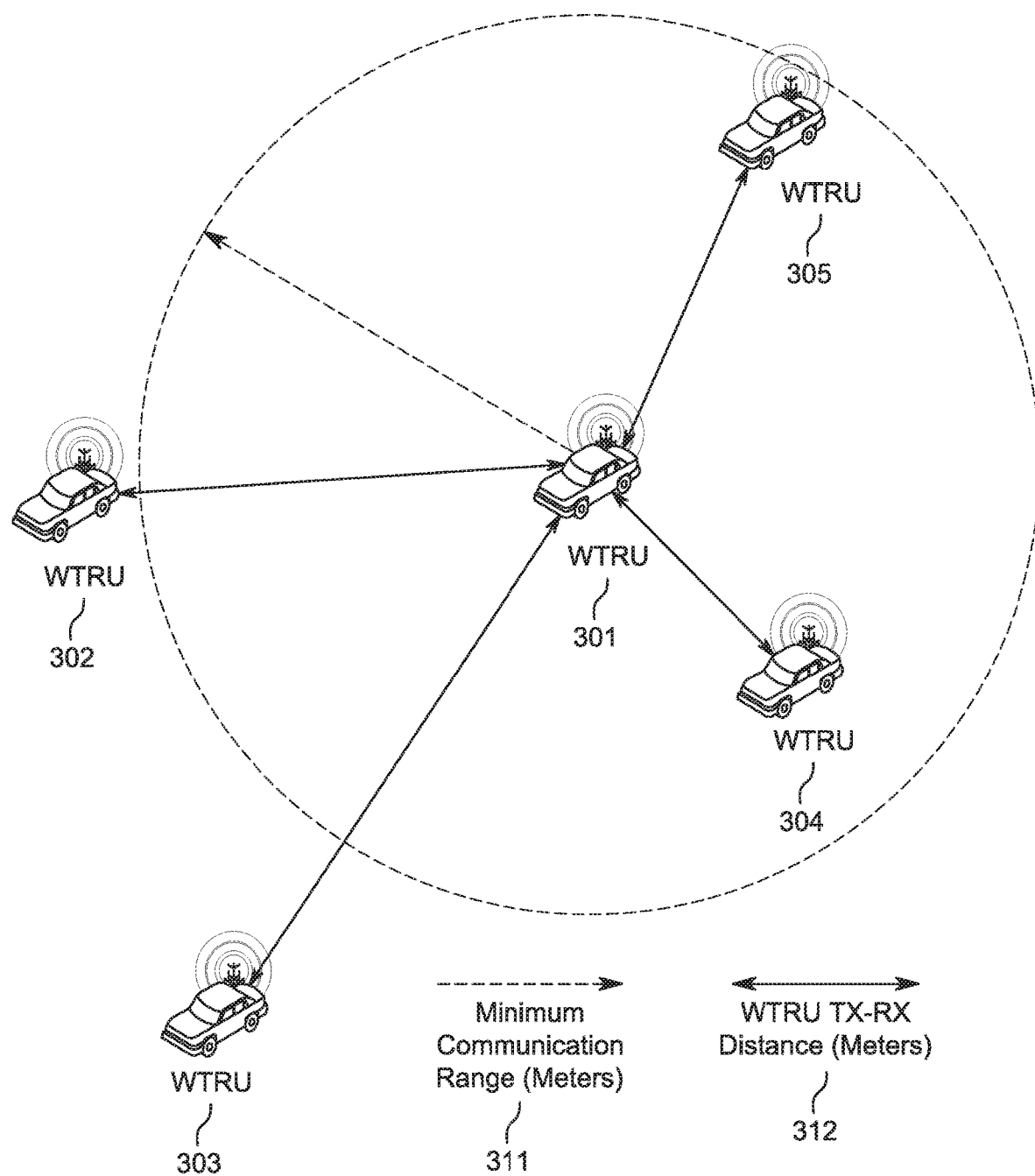
FIG. 3 illustrates an example of a MCR with a plurality of WTRUs

In one approach to determining TX-RX distance, an Area may be divided into a grid of geographic boundaries (e.g., zones, local zones, sub-zones, etc.), resulting in a sub-zone configuration; the division may be based on range requirements as dictated by the network. Further, each sub-zone configuration may be specific to a V2X service, each with different minimum communication range (MCR) requirements. FIG. 3 illustrates an example of a MCR with a plurality of WTRUs. The MCR 311 is shown in a circle with a dashed line and shows the minimum distance for one WTRU 301 to communicate with one or more other WTRUs (e.g., WTRU 302, 303, 304, and/or 305). The WTRU TX-RX distance is shown with a solid line for each WTRU communicating with WTRU 301. For this example, WTRU 301 is the origin for the MCR 311. As shown, WTRUs 302 and 303 are outside of the MCR 311 and would not be able to perform certain functions with respect to WTRU 301 (e.g., HARQ). Further, WTRUs 304 and 305 are within the MCR, and would therefore be able to communicate with WTRU 301.

Figure 4:
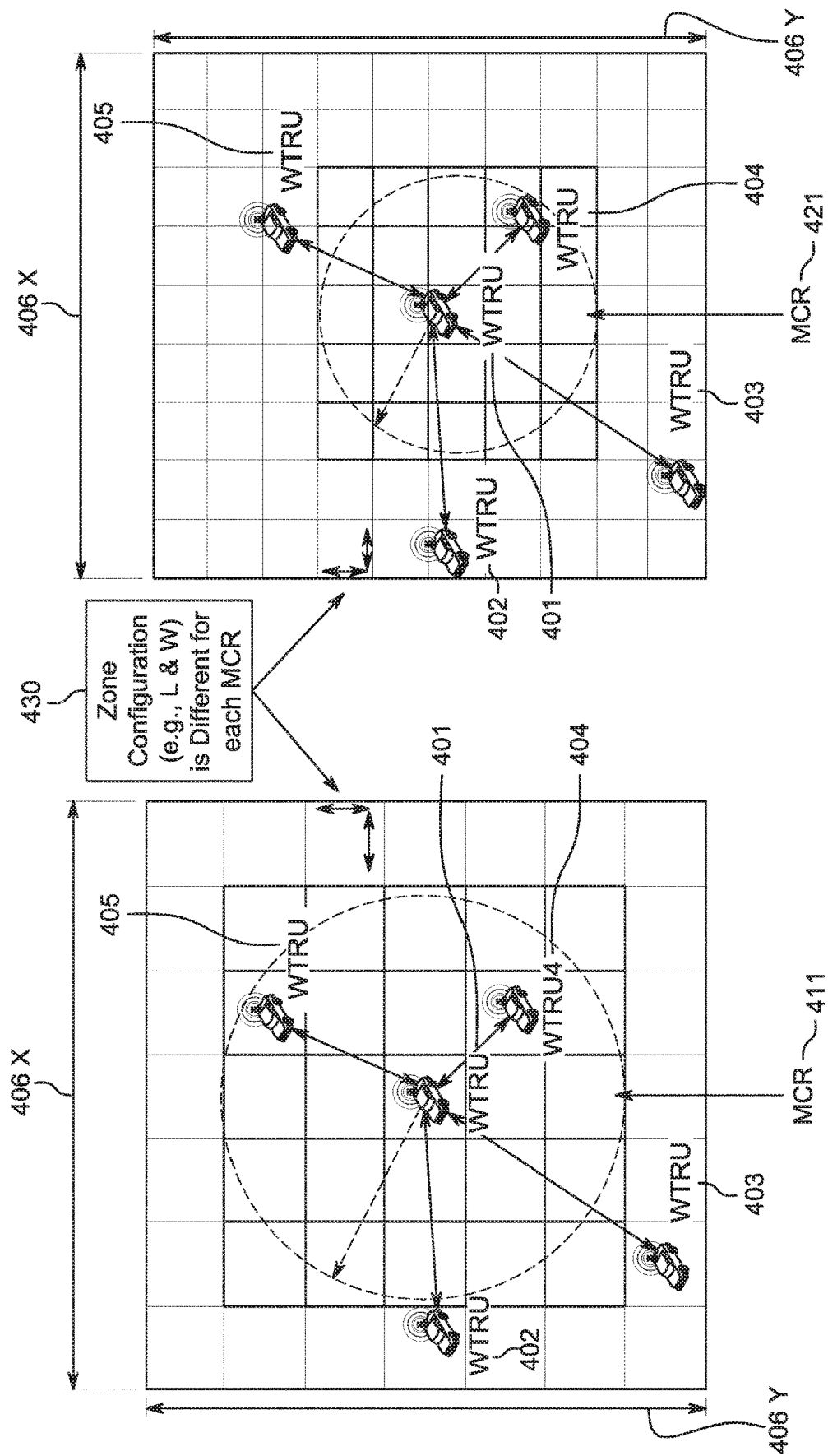
FIG. 4 illustrates an example of how different MCRs require different zone configurations.

FIG. 4 illustrates an example of how different MCRs require different zone configurations. Generally, a WTRU may be (pre)configured with a set of sub-zone configurations. Each sub-zone configuration may include modulo and dimension parameters. The dimension parameters may include, length and width, for example, for a rectangle-shaped sub-zone configuration. In one example (e.g., as shown in FIG. 4), the rectangle-shaped sub-zone may be a square where each sub-zone has the same length and width. In another example, a sub-zone configuration may include side length for an octagon-shaped sub-zone. In some cases, a WTRU may determine a sub-zone configuration with each configured V2X service based on the MCR requirement of the V2X service. For example, a V2X service with a small MCR requirement may require better distance measurement accuracy and thus a smaller sub-zone may be used.

In the example of FIG. 4, two MCRs 411 and 421 are shown. For each example MCR, the total Area may have the same or roughly the same dimensions 406 X and 406 Y. Depending on the MCR, the Area may be divided up differently where each sub-zone has different length and width as shown at 430. Note, that for purposes of demonstration each WTRU (401, 402, 403, 404, 405) may be in the same location of the given Area so that the different sub-zone configurations may be illustrated. As shown, MCR 411 may represent a V2X service that has a smaller MCR requirement that requires better distance measurement accuracy in comparison to MCR 421.

In some cases, a WTRU may use a sub-zone configuration associated with the smallest MCR configured for any active sidelink radio bearers (SLRBs) at the WTRU. Alternatively, a WTRU may use different sub-zone configurations, where each sub-zone configuration is used for the transmission of data associated with each SLRB or group of SLRBs.

In some cases, sub-zone information may be transmitted for a TB of corresponding V2X service. As discussed herein, a V2X service may be supported by transmission of data associated with specific requirements (e.g., QoS, latency, bandwidth, etc.). A RX WTRU may compute and maintain sub-zone information, such as sub-zone ID, based on the configured/determined sub-zone configuration and/or the geographical information, for the corresponding V2X service. For a PSSCH transmission of a TB, a WTRU may determine the V2X service applicable to the TB and select the appropriate sub-zone information. A TX WTRU may indicate such sub-zone information (e.g., a sub-zone ID), in the SCI transmitted in the PSCCH associated with the PSSCH carrying the TB.

Figure 5:
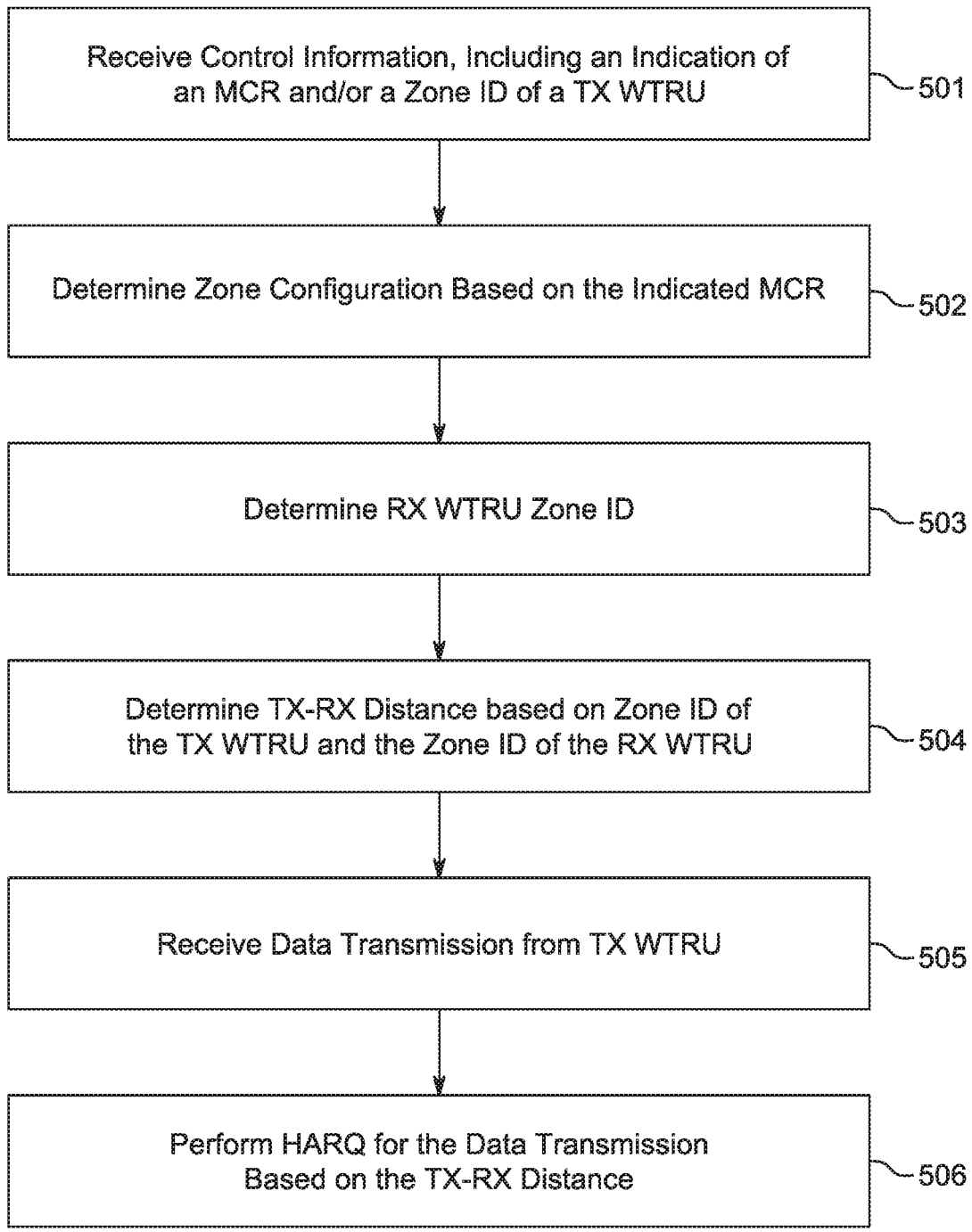
FIG. 5 illustrates an example process for computing TX-RX distance based on a MCR.

FIG. 5 illustrates an example process for computing TX-RX distance based on a MCR. Generally, a RX WTRU may determine a RX WTRU sub-zone ID to use based on the MCR indicated in the received PSCCH and compute a TX-RX distance using the determined RX WTRU sub-zone ID and the TX WTRU sub-zone ID received in the PSCCH (e.g., SCI). The RX WTRU may determine the sub-zone configuration to use based on the MCR indicated in the received PSCCH from the TX WTRU. The RX WTRU may compute the RX WTRU sub-zone ID based on the determined sub-zone configuration (e.g., using a rectangular configuration).

While FIG. 5 presents an example process with steps in a particular order, a person of ordinary skill in the art will appreciate that any of the steps may be optional and that they may be performed in an order that is different than presented. Initially, a RX WTRU may be (pre)configured with one or more MCR(s). In one example, each MCR may be associated with a sub-zone configuration that defines how the Area in question would be divided and identified to any relevant WTRU; this is further described herein. At 501, the RX WTRU may receive control information (e.g., SCI) on a control channel (e.g., PSCCH) from a TX WTRU. The control information may include an indication of a MCR and/or a sub-zone ID of the TX WTRU. In one example, the MCR may be specific to a V2X service of a TB to be sent in an associated PSSCH. At 502, the RX WTRU may determine the sub-zone configuration based on the received MCR. At 503, the RX WTRU may determine the sub-zone ID for itself based on the determined sub-zone configuration and the WGS84 model. In some instances, a set of RX WTRU sub-zone IDs may be computed and updated for each supported MCR and the RX WTRU may select one RX WTRU sub-zone ID based on the MCR that is indicated in a PSCCH from the TX WTRU.

At 504, the RX WTRU may determine the TX-RX distance based on the TX WTRU sub-zone ID and the RX WTRU sub-zone ID. At 505, the RX WTRU may receive a data transmission (e.g., TB in a PSSCH) associated with the previously received control information from the TX WTRU. At 506, the RX WTRU may perform HARQ for the data transmission based on the TX-RX distance. In one example, the RX WTRU may determine not to transmit a HARQ ACK/NACK when the determined WTRU TX-RX distance exceeds the MCR received in the PSCCH from the TX WTRU.

In an example related to FIG. 5, in order to determine the sub-zone ID the RX WTRU may compute the following (e.g., a rectangular scenario): $X_1$=Floor (X/L) Mod $N_X$ and $Y_1$=Floor (Y/W) Mod $N_Y$, such that RX WTRU sub-zone ID=$Y_1*N_X+X_1$. For these computations, X may be the geodesic distance in longitude between the RX WTRU's current location and geographical coordinates (0, 0), and Y may be the geodesic distance in latitude between the RX WTRU's current location and geographical coordinates (0, 0). Additionally, L may be SubzoneLength in meters, W may be the SubzoneWidth in meters, $N_X$ may be the SubzoneIdLongiMod, and $N_Y$ may be the SubzoneIdLatiMod. In some cases, each sub-zone may be square with the same length as width.

In an example related to FIG. 5, once the sub-zone ID is determined the WTRU may determine the TX-RX distance. the RX WTRU may calculate the TX-RX distance based on a delta between the TX sub zone ID and the RX sub zone ID. In one instance, a RX WTRU may look up a pre-computed mapping between the delta of sub-zone IDs and geographical distance. In another instance, the RX WTRU may compute the distance based on the following equation: WTRU TX-RX distance≈Inter-sub-zone distance=SQRT (((ABS(Floor(TXsub_zone_ID,$N_X$)−Floor(RX sub-zone_ID,$N_X$))*W)$^2$+(ABS(MOD(TXsub_Zone_ID,$N_Y$)−MOD(RXsub_Zone_ID,$N_Y$))*L)$^2$).

In one instance, a WTRU may determine a differential sub-zone ID from a reference point. A WTRU may transmit sub-zone information using a differential sub-zone ID. For example, a WTRU may be (pre)configured with a local reference point such as a gNB, a group leader V2X WTRU, and/or a V2X WTRU configured as a synchronization source. A WTRU may compute its own sub-zone ID, possibly for each applicable sub-zone configuration, and transmit a differential sub-zone ID, such as the difference between the WTRU's and the local reference point's sub-zone IDs in the SCI transmission. This may reduce L1 signaling overhead.

In one approach to determining TX-RX distance, the WTRU TX-RX distance may be determined based on geodesic distance, such as the absolute geodesic distance or a differential geodesic coordinate.

For calculating TX-RX distance based on absolute geodesic distance, a WTRU may determine a TX-RX distance based on geographical coordinates (X, Y) in meters according to WGS84 model, where X is the geodesic distance in longitude between the WTRU's current location and geographical coordinates (0, 0), and Y is the geodesic distance in latitude between the WTRU's current location and geographical coordinates (0, 0).

For this scenario, a RX WTRU may determine a TX-RX distance based on the coordinate of TX WTRU (i.e., TX_X/TX_Y) and RX WTRU (i.e., RX_X/RX_Y) by applying TX-RX distance=SQRT((TX_X−RX_X)$^2$+(TX_Y−RX_Y)$^2$). Further, a TX WTRU may transmit the absolute geodesic distances (e.g., X and Y), to a RX WTRU via PHY and/or higher layer signaling. However, the distance values may be very large and require a large number of bits in the signaling.

For calculating TX-RX distance based on differential geodesic distance, a WTRU may determine a differential geodesic coordinate based on a Area configuration in order to reduce PHY signaling for dynamic transmission of the geographical information. The WTRU may determine a differential geodesic coordinate ($X_2$, $Y_2$) based on: $X_2$=X Mod L, and $Y_2$=Y Mod W, where L and W may be the (pre)configured zoneLength and zoneWidth, respectively in meters.

A RX WTRU may determine a TX-RX distance based on the received differential geodesic coordinate (TX_$X_2$, TX_$Y_2$), its own geodesic coordinate (X, Y), and an Area ID. The RX WTRU may determine whether the RX WTRU and the TX WTRU are located in the same Area based on a received TX WTRU Area_ID. The RX WTRU may determine the delta values as follows when the TX WTRU and RX WTRU are not in the same Area, where Delta_$X_1$ is the difference between TX_$X_1$ and RX_$X_1$, and Delta_$Y_1$ is the difference between TX_$Y_1$ and RX_$Y_1$.

A RX WTRU may compute RX_$X_1$ and RX_$Y_1$ as discussed herein and derive TX_$X_1$ and TX_$Y_1$ based on TX_$X_1$=TX WTRU Area_ID Mod $N_X$, and TX_$Y_1$=Floor (TX WTRU Area_ID/$N_X$).

In some situations, TX_$X_1$ and TX_$Y_1$ may be indicated in PSCCH associated with the PSSCH transmission. For example, a WTRU may indicate each value in a 2-bit field in the SCI.

The RX WTRU may then determine an TX_X/TX_Y based on the following, where: TX_X=(Floor (RX_X/L)+Delta_X1)*L+TX_$X_2$, and TX_Y=(Floor(RX_Y/W)+Delta_$Y_1$)*W+TX_$Y_2$. The RX WTRU may determine the TX-RX distance based on TX-RX distance=SQRT ((TX_X−RX_X)$^2$+(TX_Y−RX_Y)$^2$).

Alternatively, a WTRU may determine a differential geodesic coordinate ($X_2$, $Y_2$) based on and a (pre)configured local geographical reference point. In one example, the local geographical reference point may be (X_gNB, Y_gNB) of the gNB the WTRU may camp on. In another example, a local geographical reference point may be a group leader in a groupcast transmission. In another example, a local geographical reference point may be a V2X WTRU providing synchronization sources. A WTRU may receive such geographical information via downlink higher layer signaling and determine a differential geodesic coordinate ($X_2$, $Y_2$) based on $X_2$=X_WTRU−X_gNB and $Y_2$=Y_WTRU−Y_gNB.

A RX WTRU may determine a TX-RX distance based on the received differential geodesic coordinate (TX_$X_2$, TX_$Y_2$), its own geodesic coordinate (X, Y), and Area ID, where the RX WTRU may determine an TX_X/TX_Y based on TX_X=X_gNB+TX_$X_2$ and TX_Y=Y_gNB+TX_$Y_2$, as well as determine the TX-RX distance based on TX-RX distance=SQRT ((TX_X−RX_X)$^2$+(TX_Y−RX_Y)$^2$).

A WTRU may include an TX WTRU differential geodesic distance field in a PSCCH transmission. In one example, a WTRU may transmit the TX_$X_2$ and TX_$Y_2$ in a SCI bit field in the PSCCH associated with the PSSCH transmission. In another example, a WTRU may include such information in higher layer signaling (e.g., MAC CE and/or RRC signaling).

In one approach to determining TX-RX distance, a WTRU may base a TX-RX distance determination on a WTRU ID. A WTRU may be (pre)configured with WTRU identity (ID) information at both higher layers and PHY layer, (e.g., WTRU Source ID and Destination ID). Additionally, in a groupcast transmission, a group member WTRU may be configured (e.g., by higher layers) with a group-specific WTRU ID.

In one case, a WTRU may associate a WTRU ID with WTRU location information, such as based on Zone ID, sub-zone ID, geographical coordinates, and the like. For a unicast transmission, a WTRU may select an L1 Source ID based on WTRU location information. For example, a RX WTRU may obtain the TX WTRU's Source ID information via the RRC signaling during a unicast transmission establishment. For a groupcast transmission, a RX WTRU may be assigned a group-specific WTRU ID by the group leader TX WTRU based on WTRU location information (e.g., location within a platoon). An RX WTRU may determine the location of the TX WTRU based on the TX WTRU's group-specific WTRU ID.

In order to keep the associated WTRU location information up to date, a WTRU may periodically update its location information. In one example, a WTRU may transmit Zone ID, sub-zone ID, and/or geographical location information in MAC CE or RRC signaling. In another example, a WTRU may transmit its location information such as Zone ID and sub-zone ID along with its L1 Source ID in a PHY feedback channel.

In some cases, a WTRU may determine location information based on one or more PSFCH resources. Further, the WTRU's location information such as Zone ID and sub-zone ID may be associated with a PSFCH resource (e.g., including time domain, frequency domain, and code domain). In this case, the location information may not be explicitly transmitted in a PHY feedback channel, rather it may be conveyed in an implicit manner. For example, the time-frequency resource 1 may be for a subset of Zone IDs or sub-zone IDs, while the time-frequency resource 2 may be for another subset of Zone IDs or sub-zone IDs. By detecting which PSFCH resources the PHY feedback occupies, a RX WTRU may know the location information of the TX WTRU which makes the PSFCH transmissions.

In another case, a WTRU may update the WTRU location information associated with its L1 Source ID when one or more conditions occur, such as: WTRU ID change by higher layers for security reasons, (e.g., WTRU Source ID may be changed); TX-RX distance exceeding a (pre)configured threshold; WTRU speed exceeding a (pre)configured threshold; CSI reporting requests; and/or, periodically, whereby the period of such update may depend on the WTRU speed (e.g., a WTRU with higher speed may update its location information associated with L1 ID more frequently).

In some cases, an implicit WTRU location indication using WTRU L1 ID may use a bit field in the SCI to convey the WTRU location information and improve the L1 signaling efficiency. A RX WTRU may determine WTRU TX-RX distance based on the L1 Source ID information including in the SCI associated with a TB transmission.

In another case, a WTRU may transmit a location in SCI for some scenarios (e.g., where its not possible to associate its location information with Source ID) while it may transmit only an L1 Source ID in other scenarios (e.g., it is possible to associate Source ID with location information).

For example, the WTRU may use a different SCI format for the two scenarios. Alternatively, the WTRU may use the same format and may or may not indicate the type of ID being transmitted. The WTRU may use location-associated versus non-location-associated depending on the following scenarios: Transmission vs retransmission, where a WTRU may use a non-location based L1 ID for the transmission, and use a location based ID for the retransmission, which may have the advantage of being able to provide a WTRU's location without additional overhead (e.g., based on known association by the RX WTRU of the transmission and retransmission resource); QoS of the transmission, where a WTRU may transmit a location-associated L1 ID for transmissions associated with an MCR; Data vs Control, where a WTRU may transmit a location-associated L1 ID only for control transmissions (e.g., PC5 RRC) and not for data, or vice versa; and/or, Depending on WTRU speed.

For any of the TX-RX distance determining approaches discussed herein, in some situations the locations of either the TX WTRU or RX WTRU may be unknown.

In one situation, the TX WTRU may indicate an "unknown location" status to a RX WTRU(s). For example, the TX WTRU may use a codepoint in one bitfield (e.g., location information bitfield) of the first or second stage SCI to indicate the "unknown location" status to the RX WTRU(s). Alternatively, the TX WTRU may use one bit in the first stage SCI to indicate one or more of the following: the location information is available or not; and/or, the second stage SCI may include TX WTRU location information or not.

In some cases where the TX WTRU indicates an "unknown location" to a RX WTRU in the SCI, the RX WTRU may transmit a NACK when the RX WTRU cannot decode the message regardless of other parameters, such as MCR. Conversely, and as further described in the example of FIG. 5, the RX WTRU may determine to transmit HARQ NACK feedback when it can decode the SCI. Specifically, the WTRU may perform NACK-based feedback for unicast/groupcast, in which the WTRU may only transmit NACK when it cannot decode the message. If the location information of the TX WTRU is indicated in the SCI, the WTRU may transmit NACK when it cannot decode the message and the TX-RX distance is smaller than the MCR as indicated in the SCI.

In some cases where the TX WTRU indicates an "unknown location" to a RX WTRU in the SCI, the WTRU may use SL-RSRP to determine the transmission of HARQ NACK feedback. Alternatively, the WTRU may use path loss between the TX WTRU and RX WTRU to determine the transmission of HARQ NACK feedback. Specifically, when the TX WTRU indicates the "unknown location" status in the SCI, the RX WTRU may transmit the NACK when SL-RSRP of the PSSCH/PSCCH is greater than a threshold or the path-loss between the TX WTRU and RX WTRU is smaller than a threshold. Conversely, when the SCI does contain the TX WTRU location, the RX WTRU may determine to send HARQ NACK feedback based on SL-RSRP of the PSSCH/PSCCH or the pathloss between the TX WTRU and RX WTRU. Additionally or alternatively, when the location information of the TX WTRU is indicated in the SCI, the RX WTRU may use TX-RX distance to determine the transmission of HARQ NACK feedback.

In some cases where the TX WTRU indicates an "unknown location" to a RX WTRU in the SCI, the RX WTRU may determine to send HARQ NACK feedback based on the location information obtained from a previously received location of the TX WTRU. For example, the RX WTRU may determine to use previously received TX WTRU location information from the TX WTRU to compute a TX-RX distance associated with a received TB. Additionally, the RX WTRU may determine whether a time period between the reception of the TX WTRU location and the TB transmission exceeds a threshold; the threshold may be (pre)configured or determined by the RX WTRU based on one or all of the WTRU's speed, channel condition, and/or QoS requirement (e.g., reliability).

In some cases where it is possible that the TX WTRU indicates an "unknown location" to a RX WTRU in the SCI, the TX WTRU may determine whether to perform retransmission or not based on the feedback from the RX WTRU. In one example, the TX WTRU may be configured with two retransmission procedures, where one procedure may be used when the TX WTRU location information is available, and the other procedure may be used when the location information is not available.

In another example, the TX WTRU may be configured with more than one maximum number of retransmissions, such as: one value may be used for the case where the location information is available; and the other value may be used for the case where the TX WTRU location information is not available.

In another example, the TX WTRU may determine to perform feedback based HARQ retransmission based on the RSRP/RSSI of the PSFCH. Specifically, the TX WTRU may perform retransmission if the RSRP/RSSI of the PSFCH is greater than a threshold and may not perform retransmission if the RSRP/RSSI of the PSFCH is smaller than a threshold. Alternatively, the TX WTRU may perform a fixed number of retransmissions when the TX WTRU location information is not available. The fixed number of retransmissions may be determined based on the QoS of the TB and/or CBR of the resource pool.

For any of the TX-RX distance determining approaches discussed herein, in some situations a WTRU may make use of the (pre)configured and/or determined zones (e.g., Area, SL zone, sub-zone, local zone, etc.) for resource pool selection.

In one scenario, a WTRU may be configured with a TX resource pool configuration that is zone-based, and another TX resource pool configuration that is non-zone based, the WTRU may determine whether to use the zone-based TX pool configuration or to use the non-zone-based TX pool configuration depending on the type of data to be transmitted. Specifically, the WTRU may decide for a first type of data to transmit using a TX resource pool that is configured based on the WTRU's geolocation and a determination of the WTRUs current zone (e.g., LTE). For a second type of data, the WTRU may be configured to use a TX resource pool configuration that is not based on zone configuration, where the WTRU is configured with a single TX pool that is to be used regardless of the WTRU's location.

In some situations, the WTRU may select whether to use zone-based or non-zone-based TX resource pool for transmission of data based on any of the following aspects related to the type of data, or any combination of such aspects: size of data packet transmission, periodicity of data transmission, speed of WTRU, and/or QoS parameter.

For size of data packet transmission, for example, a WTRU may be configured to transmit small packets on zone-based pool configuration. Specifically, the WTRU may be configured with a threshold packet size, and may transmit all packets with a size below the threshold using zone-based TX resource pool For periodicity of data transmissions, for example, a WTRU may be configured to transmit all periodic transmissions on zone-based TX resource pool configuration. For example, a WTRU may perform all transmissions associated with periodic resource reservations performed by the WTRU on a zone-based TX resource pool.

For speed of the WTRU, for example, a WTRU may decide whether to transmit a specific data packet using zone-based TX resource pool configuration depending on the current speed of the WTRU. Specifically, a WTRU travelling at a speed above a threshold may not perform transmission on a zone-based TX resource pool.

For QoS parameter, for example, a WTRU may determine based on one or more QoS parameters whether to perform transmission of data associated with that QoS on a zone-based TX resource pool.

In the situation where a WTRU decides whether or not to use a zone-based resource pool selection based on the type of data, in some cases the type of data may be implicitly mapped to a logical channel (LCH). For example, where the WTRU decides whether or not to use zone-based resource pool selection, the WTRU may determine whether to perform zone-based pool configuration based on a LCH mapping and/or restriction to TX resource pool configuration. For instance, a WTRU may be (pre)configured with an explicit mapping of SLRB or LCH to TX resource pool configuration (e.g., zone-based or non-zone based) to be used. A WTRU may further be configured with conditions (e.g., speed, pool congestion, etc.) in which such explicit mapping may or may not apply for a specific LCH. Alternatively, a WTRU may be (pre)configured with a property of the LCH that implicitly results in mapping that property to a zone-based TX resource pool configuration. This configuration for the property of the LCH may be obtained from dedicated configuration, SIB, or (pre)configuration.

In the situation where a WTRU decides whether or not to use a zone-based resource pool selection based on the type of data, in some cases logical channel prioritization (LCP) restriction may be based on data type. A WTRU may be configured with an LCP restriction based on the data type, whereby the data type is determined by any of the techniques described herein. For example, a WTRU may select a first LCH during LCP and may only select subsequent LCHs that have the same selected property following this LCP. Alternatively, a WTRU may receive an indication of the grant type during performance of LCP. This grant type may indicate that the resource is associated with a zone-based TX pool or a non-zone-based TX pool. This grant type may implicitly indicate the mapping to a zone-based TX resource pool. For example, the grant may indicate a mapping to specific LCHs meant for transmission on a zone-based TX resource pool based on the size of the grant and/or the nature of the grant (e.g., LTE like grant, legacy like grant, etc.). A WTRU may be allowed to select from LCHs for LCP that correspond to a particular grant type. Specifically, for a grant that is associated with zone-based TX resource pool, the WTRU may only select data from LCHs that are allowed (e.g., by pre-configuration) for transmission on such TX resource pools.

In the situation where a WTRU decides whether or not to use a zone-based resource pool selection based on the type of data, in some cases resource selection may take data type into account. A WTRU may trigger resource (re)selection by taking into account the type of data and its association to zone-based TX resource pool. For example, for certain LCHs that meet the data type criteria, or are (pre)configured with a specific explicit/implicit indication, a WTRU may perform resource selection on a zone-based TX resource pool when data arrives for that LCH and a zone-based TX resource pool mode 2 grant does not already exist. Alternatively, a WTRU may perform resource selection for all periodic resource reservations on a zone-based TX resource pool and perform any one-shot or asynchronous resource selections on a non-zone-based resource pool. The WTRU may then determine which resource pool to perform resource selection on based on the logical channels with data available in the buffers.

Although features, techniques, approaches, examples, cases, situations, and elements are described above in particular combinations, one of ordinary skill in the art will appreciate that each of these features, techniques, approaches, examples, cases, situations, and elements may be used alone or in any combination with the other features, techniques, approaches, examples, cases, situations, and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a first wireless transmit receive unit (WTRU), the method comprising:
    receiving configuration information, wherein the configuration information includes a set of zone configurations, wherein each zone configuration of the set of zone configurations is associated with a respective communication range requirement, wherein each zone configuration of the set of zone configurations has a respective zone associated length;
    determining a zone associated length from the set of zone configurations based on a communication range requirement of a transport block (TB), wherein the TB is associated with a vehicle-to-everything (V2X) service;
    determining a zone ID associated with a transmission of the TB based on the zone associated length and based on location information of the first WTRU; and
    transmitting the determined zone ID associated with the transmission of the TB.

2. The method of claim 1, wherein the determined zone ID is included in control information which is transmitted in a physical sidelink (SL) control channel.

3. The method of claim 1, wherein the transmission of the TB is a groupcast transmission.

4. The method of claim 1, wherein the transmission of the TB is a data transmission transmitted on a shared channel.

5. The method of claim 2, wherein the control information is SL control information (SCI) on a physical sidelink control channel.

6. The method of claim 1, wherein the determined zone ID is transmitted to a second WTRU.

7. The method of claim 6, wherein the transmission of the TB is for the second WTRU.

8. The method of claim 2, wherein the control information includes a first stage SL control information and a second stage SL control information.

9. A first wireless transmit/receive unit (WTRU) comprising:
- a processor, and
- a transceiver coupled to the processor,
  - the processor and transceiver configured to receive configuration information, wherein the configuration information includes a set of zone configurations, wherein each zone configuration of the set of zone configurations is associated with a respective communication range requirement, wherein each zone configuration of the set of zone configurations has a respective zone associated length;
  - the processor and transceiver configured to determine a zone associated length from the set of zone configurations based on a communication range requirement of a transport block (TB), wherein the TB is associated with a vehicle-to-everything (V2X) service;
  - the processor and transceiver configured to determine a zone ID associated with a transmission of the TB based on the zone associated length and based on location information of the first WTRU; and
  - the processor and transceiver configured to transmit the determined zone ID associated with the transmission of the TB.

10. The first WTRU of claim 9, wherein the determined zone ID is included in control information which is transmitted in a physical sidelink (SL) control channel.

11. The first WTRU of claim 9, wherein the transmission of the TB is a groupcast transmission.

12. The first WTRU of claim 9, wherein the transmission of the TB is a data transmission transmitted on a shared channel.

13. The first WTRU of claim 10, wherein the control information is SL control information (SCI) on a physical sidelink channel.

14. The first WTRU of claim 9, wherein the determined zone ID is transmitted to a second WTRU.

15. The first WTRU of claim 14, wherein the transmission of the TB is for the second WTRU.

* * * * *